United States Patent
Hosaka (10) Patent No.: US 9,836,359 B2
(45) Date of Patent: Dec. 5, 2017

(54) STORAGE AND CONTROL METHOD OF THE SAME

(71) Applicant: Hitachi, Ltd., Tokyo (JP)

(72) Inventor: Fumiaki Hosaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 307 days.

(21) Appl. No.: 14/425,897

(22) PCT Filed: Jul. 11, 2014

(86) PCT No.: PCT/JP2014/068610
§ 371 (c)(1),
(2) Date: Mar. 4, 2015

(87) PCT Pub. No.: WO2016/006108
PCT Pub. Date: Jan. 14, 2016

(65) Prior Publication Data
US 2016/0259695 A1    Sep. 8, 2016

(51) Int. Cl.
*G06F 11/14* (2006.01)
*G06F 3/06* (2006.01)
*G06F 12/08* (2016.01)
*G06F 12/16* (2006.01)
*G06F 12/0868* (2016.01)

(52) U.S. Cl.
CPC ............ *G06F 11/1469* (2013.01); *G06F 3/06* (2013.01); *G06F 11/1435* (2013.01); *G06F 12/08* (2013.01); *G06F 12/0868* (2013.01); *G06F 12/16* (2013.01); *G06F 2201/84* (2013.01); *G06F 2212/214* (2013.01); *G06F 2212/225* (2013.01)

(58) Field of Classification Search
CPC ............ G06F 11/1469; G06F 11/1464; G06F 11/1453; G06F 11/1076; G06F 11/1458; G06F 11/1448; G06F 11/1456; G06F 11/0751; G06F 11/0793; G06F 3/067; G06F 3/0608; G06F 3/0619; G06F 3/0641
See application file for complete search history.

(56) References Cited

U.S. PATENT DOCUMENTS

| | | | |
|---|---|---|---|
| 7,260,695 B2 * | 8/2007 | Batchelor | G06F 11/1441 711/104 |
| 2004/0255181 A1* | 12/2004 | Hsu | G06F 11/1441 714/2 |
| 2008/0104344 A1* | 5/2008 | Shimozono | G06F 11/1441 711/162 |

(Continued)

FOREIGN PATENT DOCUMENTS

| JP | 2001-147865 A | 5/2001 |
|---|---|---|
| JP | 2008-108026 A | 5/2008 |

(Continued)

*Primary Examiner* — Nadeem Iqbal
(74) *Attorney, Agent, or Firm* — Volpe and Koenig, P.C.

(57) ABSTRACT

There is provided a storage having plural clusters. Each of the clusters includes a cache memory and a save memory. The processor of each of the clusters controls to write plural data pieces into the cache memory, controls to store all the data stored in the cache memory into the save memory upon an occurrence of a failure, and controls to restore some of the data stored in the save memory into the cache memory upon recovery from the failure.

6 Claims, 9 Drawing Sheets

(56) References Cited

U.S. PATENT DOCUMENTS

| | | | |
|---|---|---|---|
| 2008/0195807 A1* | 8/2008 | Kubo | G06F 12/126 711/114 |
| 2011/0202791 A1* | 8/2011 | Saitou | G06F 11/2097 714/6.12 |
| 2013/0254457 A1* | 9/2013 | Mukker | G06F 11/1441 711/103 |

FOREIGN PATENT DOCUMENTS

| | | |
|---|---|---|
| JP | 2011-170589 A | 9/2011 |
| JP | 2012-078941 A | 4/2012 |

\* cited by examiner

STORAGE AND CONTROL METHOD OF THE SAME

TECHNICAL FIELD

The present invention relates to a storage and a control method of the storage.

BACKGROUND ART

The loss of data stored in a storage will be a major obstacle. For this reason, the storage is designed to copy data that is stored in a volatile cache memory but is not stored in a disk drive or other storage media, to a nonvolatile memory during a power outage or other electrical emergency, and to return the data from the nonvolatile memory to the cache memory after the power is recovered. Such a technique is disclosed, for example, in Patent Literature 1.

CITATION LIST

Patent Literature

Patent Literature 1: Japanese Unexamined Patent Application Publication No. 2008-108026

SUMMARY OF INVENTION

Technical Problem

When the technique disclosed in Patent Literature 1 is used, the data will not be lost even in the case of a power outage or other electrical emergency. However, when the amount of data stored in the cache memory is large, the time for returning the data after power recovery is increased. As a result, it will take time to resume operations using the storage.

Accordingly, an object of the present invention is to reduce the time until the storage is made available in order to implement early resumption of operations using the storage.

Solution to Problem

A typical storage according to the present invention is a storage having plural clusters. Each of the clusters includes a processor, a cache memory, and a save memory. The processor of each of the clusters is designed to control to write plural data pieces into the cache memory, control to store all the data stored in the cache memory into the save memory upon an occurrence of a failure, and control to restore some of the data stored in the save memory upon recovery from the failure.

Further, the present invention can also be viewed as a method for controlling the storage.

Advantageous Effects of Invention

According to the present invention, it is possible to reduce the time until the storage is made available in order to implement early resumption of operations using the storage.

DESCRIPTION OF EMBODIMENTS

Hereinafter a preferred embodiment will be described with reference to the accompanying drawings. Note that in the following description, various types of information is sometimes described using the expression of "xxx table", but may also be expressed by the data structure except for the table. In order to show that the information is not dependent on the data structure, "xxx table" can be referred to as "xxx information".

Further, in the following description, the process is sometimes described with a processor (CPU: Central Processing Unit) as the subject. However, the processor may be a controller including a processor. The processor executes a program to perform a predetermined process by using an appropriate memory resource (for example, a memory chip) and/or a communication interface device (for example, a communication port). The process described with the processor as the subject may be a process that a system (for example, a common computer or server) with the particular processor performs. Further, the processor may include a hardware circuit to perform a part or whole of the process that the processor performs, in addition to the execution of the program.

When the system with the processor is referred to as a computer, the program may be installed into the computer by a storage medium that can be read by a program distribution server and the computer. In this case, the program distribution server includes a processor and a memory resource. The memory resource further stores a distribution program and a program to be distributed. Then, the processor of the program distribution server executes the distribution program to distribute the program to be distributed to other computers.

Note that the computer includes an input/output device to perform various settings and the like. Examples of the input/output device include, but not limited to, a display, a keyboard, a pointer device and the like. Further, a serial interface or a network interface may be used as a substitute for the input/output device. More specifically, input and display operations in the input device may be substituted by connecting a display computer provided with a display or a keyboard or a pointer device, and the like, to the particular interface, and by transmitting display information to the display computer and receiving input information from the display computer.

Figure 1:
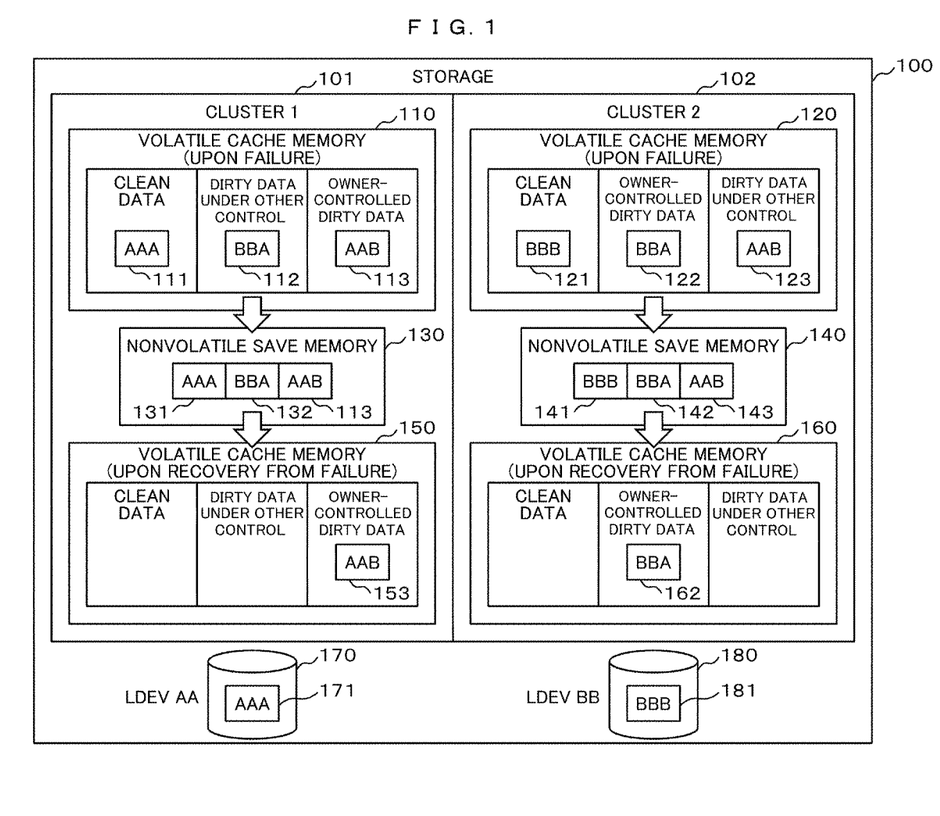
FIG. 1 is a view of an example of the process involved in cache memory of a storage.

FIG. 1 is a view showing the outline of the present embodiment, which shows an example of the process involved in cache memory. A storage 100 includes a cluster 1 101 and a cluster 2 102. Each cluster has a volatile cache memory to speed up reading and writing of data. The storage 100 includes plural storage devices, such as a hard disk drive (HDD) and a solid state drive (SSD), in which plural logical devices (LDEVs) are configured in the plural storage devices. For example, the configuration of LDEV may be such that portions of the areas of the plural storage devices are put together into one area to form a single LDEV, or plural partial areas of one storage device are respectively assigned to different LDEVs.

AAA 111 and so on are data, in which AAA 111, AAA 131, and AAA 171 are data of the same content or same value that correspond to each other, to which different reference signs are assigned due to the difference in the stored memory or device, or due to the difference in the stored time. Further, AAA 111 and BBA 112, and so on, are data that do not correspond to each other. In this case, the content or value of the data may be different or the same. When seen from the host not shown, AAA 111, AAA 131, and AAA 171 appear to have the same address, while AAA 111 and BBA 112 and so on appear to have different addresses.

The cache memory stores clean data and dirty data. The dirty data is further classified into dirty data under other control and owner-controlled dirty data. The clean data like AAA 111 is stored in LDEV AA 170 as AAA 171. Thus, if AAA 111 of the cache memory is lost, the clean data remains as AAA 171. On the other hand, the dirty data like BBA 112 and BBA 122 and so on is not stored in LDEV AA 170 and LDEV BB 180. Thus, if BBA 112 or BBA 112 in the cache memory is lost, the dirty data disappears.

The difference between data under other control and owner-controlled data is the difference between the clusters. The issue of which is data under other control and which is owner-controlled data will be described below. The dirty data BBA 112, under other control, of the cluster 1 101 and the owner-controlled dirty data BBA 122 of the cluster 2 102 have the same content and value, and the data is duplicated. The owner-controlled dirty data AAB 113 of the cluster 1 101 and the dirty data AAB 123, under other control, of the cluster 2 102 have the same content and value, and the data is duplicated.

Cache memories 110 and 120 show the state of cache memory upon an occurrence of a failure such as a power outage. Here, in order to prevent the data stored in the volatile cache memories 110 and 120 from being lost, the storage 100 stores AAA 111, BBA 112, and AAB 113, which are stored in the cache memory 110, into a nonvolatile save memory 130 as AAA 131, BBA 132, and AAB 133, by using a power source such as a battery. Then, the storage 100 stores BBB 121, BBA 122, and AAB 123, which are stored in the cache memory 120, into a nonvolatile save memory 140 as AAA 141, BBA 142, and AAB 143.

Upon recovery from the failure such as the power outage, the storage 100 restores the data from the save memories 130 and 140 into the cache memories to make the storage 100 available. Cache memories 150 and 160 show the state of cache memory at this time. In other words, the storage 100 restores the owner-controlled dirty data AAB 133, which is stored in the save memory 130, as AAB 153 of the cache memory 150. Further, the storage 100 restores the owner-controlled dirty data BBA 142, which is stored in the save memory 140, as BBA 162 of the cache memory 160. Then, AAA 171 of the LDEV AA 170, BBA 162 of the cache memory 160, AAB 153 of the cache memory 150, and BBB 181 of the LDEV BB 180 after recovery, are capable of substituting for AAA 111, BBAs 112 and 122, AABs 113 and 123, and BBB 121 of the cache memories 110 and 120 during the failure.

Note that the cache memory 110 and the cache memory 150 may physically be the same memory elements or may physically be different memory elements. Further, the cache memory 120 and the cache memory 160 may physically be the same memory elements or may physically be different memory elements. In any case, it is enough that they can be used as cache memory. Further, the other data of the save memories 130 and 140, for example, AAA 131 and so on are not restored. In this way, it is possible to reduce the time until the storage 100 is made available after recovery from the failure.

Figure 2:
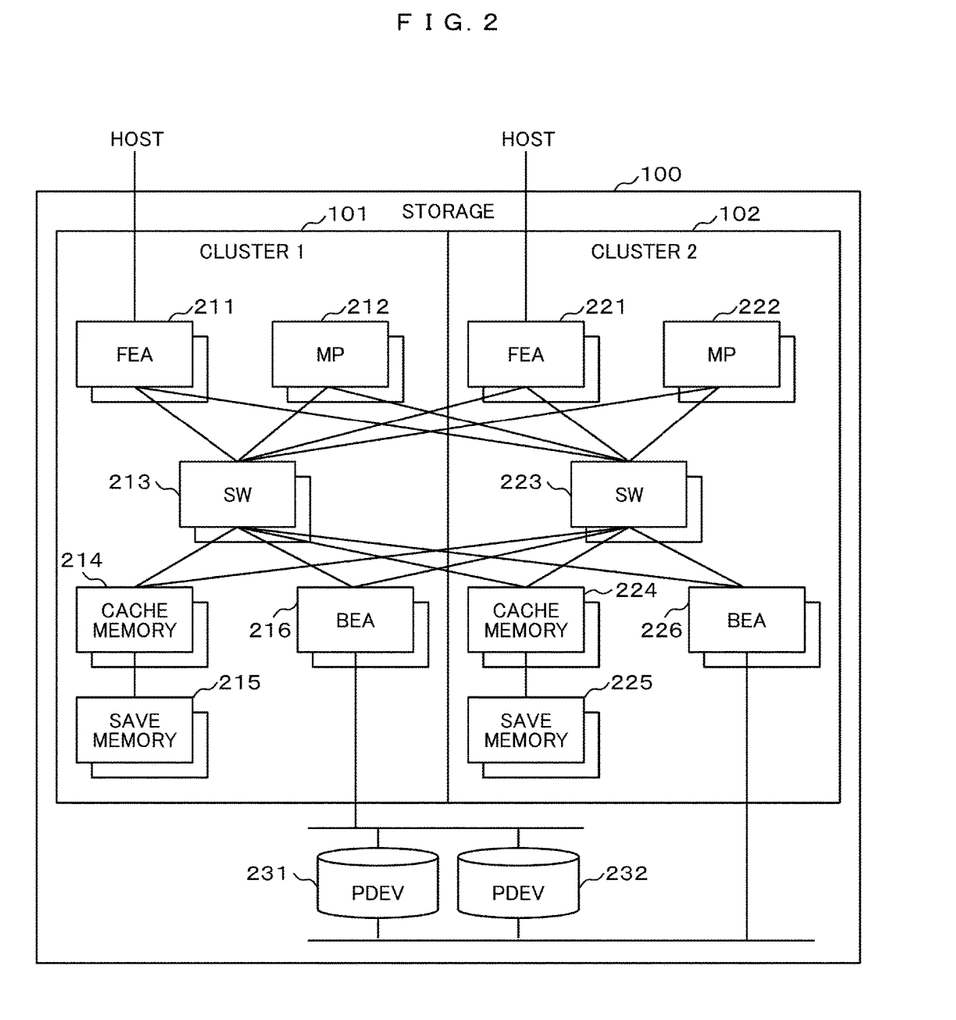
FIG. 2 is a view of an example of the hardware configuration of the storage.

Further details of the present embodiment will be described below. FIG. 2 is a view of an example of the hardware configuration of the storage 100. The cluster 1 101 and cluster 2 102 of the storage 100 have the same configuration and thus are described as a whole. Further, the number of components may be one or plural. Front end adapters (FEAs) 211 and 221 are adapters for connecting the storage 100 and the host. The FEA 211 or 221 receives read request and write data from the host, and transmits the read data to the host. The FEA 211 or 221 may be an adopter such as a fiber channel. The FEA 211 or 221 communicates with other components in the storage 100 through a switch (SW) 213 or 223.

A microprocessor (MP) 212 or 222 is a processor that operates according to a program stored in the memory, not shown, and is operable to determine information obtained through the SW 213 or 223 according to the program and to instruct other components to perform operations through the SW 213 or 223. The MP 212 or 222 may interpret the request received from the host by FEA 211 or 221 and give instructions to other components. Further, the MP 212 or 222 may detect a failure occurring in the storage 100 and execute the program based on the content of the detected failure. Further, the MP 212 or 222 may indicate which data is written into which of the two cache memories, either 214 or 224, by the FEA 211 or 222. The SW 213 or 223 is a circuit for relaying communication between the components, which may be a bus of the computer or a substitute for the bus.

The cache memory 214 or 224 is the memory for temporarily storing data to speed up wiring data through the FEA 211 or 221. The cache memories 214 and 224 are fast access volatile memories. The cache memory 214 corresponds to the cache memory 110 or 150 shown in FIG. 1, and the cache memory 224 corresponds to the cache memory 120 or 160 shown in FIG. 1. The save memory 215 or 225 is used in such a way that, according to the instruction of the MP 212 or 222, the data stored in the cache memory 214 or 224 is copied and stored in the save memory 215 or 225, and then the data stored in the save memory 215 or 225 is copied and restored to the cache memory 214 or 224. The save memories 215 and 225 are nonvolatile memories. Thus, the save memories 215 and 225 may include a circuit to transfer data between the cache memories 214, 224 and the save memories 215, 225. The save memory 215 corresponds to the save memory 130 shown in FIG. 1, and the save memory 225 corresponds to the save memory 140 shown in FIG. 1. The save memories 215 and 225 may be, for example, SSD or flash memory, or a memory with a dedicated battery that can be driven for a long time.

Back end adapters (BEAs) 216 and 226 are adapters for connecting to the storage device that actually stores data in the storage 100. The BEA 216 or 226 writes data into the storage device based on the instruction and data that are received through the SW 213 or 223. Further, the BEA 216 or 226 reads data from the storage device and transmits the data to the SW 213 or 223 based on the instruction received through the SW 213 or 223. The BEAs 216 and 226 may be, for example, adopters such as serial attached SCAI (SAS).

Physical devices (PDEVs) 231 and 232 are physical storage devices such as HDD or SDD. The PDEV 231 or 232 has plural ports, which is connected to the BEA 216 or BEA 226 and can be accessed from both the cluster 1 101 and the cluster 2 102. It is possible to configure LDEV to the PDEVs 231 and 232 so that the plural PDEVs are arranged into redundant arrays of inexpensive disks (RAID).

The storage 100 has a power source not shown. There are two types of power source: commercial power source and battery. The battery automatically supplies power when the supply of the commercial power source is stopped. The battery allows the storage 100 to be able to operate for a predetermined time according to the capacity and operation content of the battery.

Figure 3:
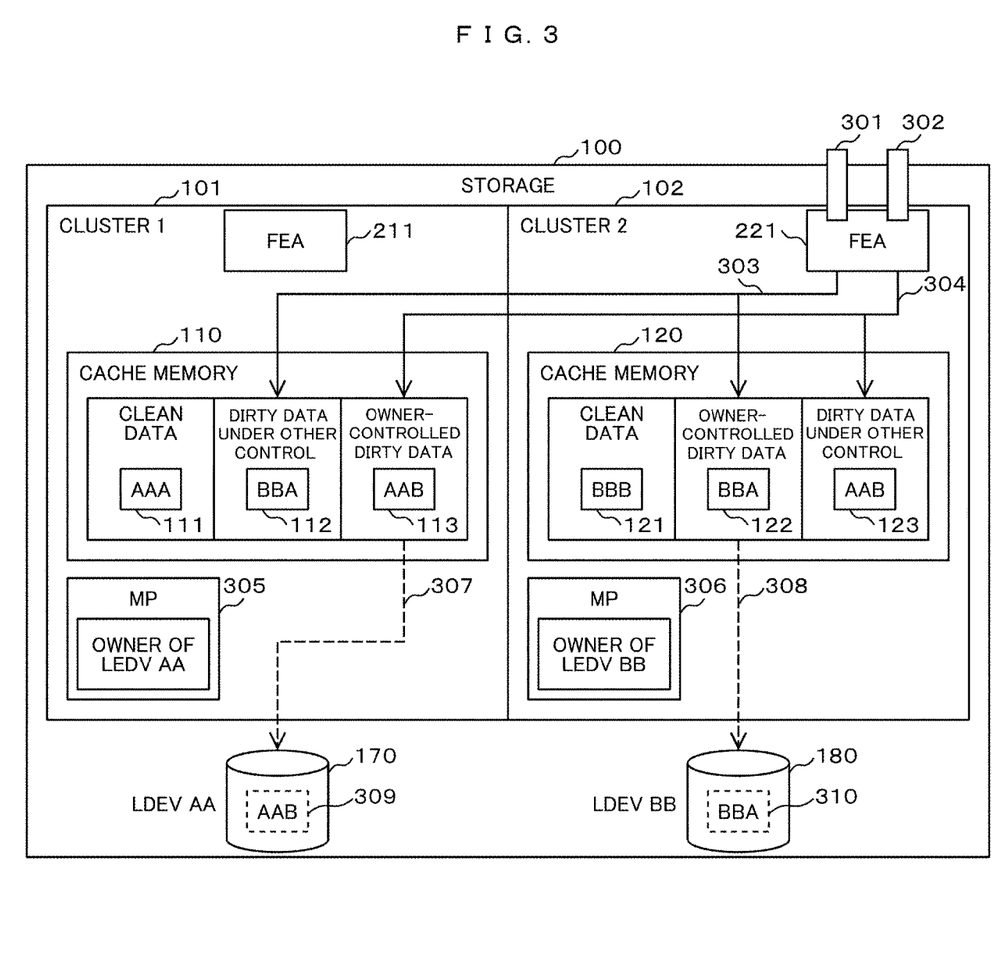
FIG. 3 is a view of an example of the type of data of the cache memory.

FIG. 3 is a view of an example of operation without a failure, showing the types of the data of the cache memories 110 and 120, in which the same reference numerals are used to designate the same components as those described above. The FEA 221 has two ports 301 and 302. The ports 301 and 302 are, for example, fiber channel ports. The FEA 221 transfers the write data received by the port 301 to the cache memories 110 and 120, respectively, as the dirty data BBA 112 under other control and the owner-controlled dirty data BBA 122 as shown by arrows 303. On the other hand, the FEA 221 transfers the write data received by the port 302 to the cache memories 110 and 120, respectively, as the owner-controlled dirty data AAB 113 and the dirty data AAB 123 under other control as shown by arrows 304.

In this example, the data transmitted and received by the port 301 is the owner-controlled data of the cluster 2 102, and the data transmitted and received by the port 302 is the owner-controlled data of the cluster 101. For example, when the correspondence between each port and each LDEV of the storage 100 is configured in advance, it is possible to determine the cluster to be set as the owner-controlled data transmitted and received by each port is stored with respect to each port. Further, although FIG. 3 shows an example of the ports 301 and 302 of the FEA 221, the ports of the FEA 211 may also be used. In this case, it is possible to determine the cluster to be set as the owner-controlled data with respect to each port of the EFA 211.

If plural MPs control the reading and writing of one LDEV, there is a possibility that reading and wiring may collide with one another. Thus, one MP is set to one LDEV as the owner to control the writing and reading of the particular LDEV. With respect to the setting of the owner, the data to be read and written under the control of the MP 212 including the MP 305 of the cluster 1 101 may be set as the owner-controlled data of the cluster 1 101, and the data to be read and written under the control of the MP 222 including the MP 306 of the cluster 2 102 may be set as the owner-controlled data of the cluster 2 102. The cache memories 110 and 120 shown in FIG. 3 are in the state before the failure, but immediately before the failure shown in FIG. 1 and thus store the same data at the time of the failure. For this reason, the owner-controlled dirty data AAB 113 is not written into the LDEV AA 170 yet. Thus, AAB 309 is not present and is shown by the dashed line in FIG. 3.

However, if the failure does not occur, AAB 113 is written into the LDEV AA 170 as AAB 309 as shown by an arrow 307 at any timing. Thus, a particular MP 305 that controls this wiring is determined in the plural MPs 212. In other words, the MP 305 is set as the owner of the LDEV AA 170 to control the writing of the whole LDEV AA 170. When the MP 305 is set as described above, AAB 113 is in the same cluster 1 101 as of the MP 305 and can be set as the owner-controlled data of the cluster 1 101. On the other hand, the MP 306 writes BBA 122 into the LDEV BB 180 as BBA 310 in the cluster 2 102 as shown by an arrow 308. Thus, BBA 122 is in the same cluster 2 102 of the MP 306 and can be set as the owner-controlled data of the cluster 2 102. Note that the process of writing the data from the cache memories to the LDEVs as shown by the arrows 307 and 308 is called destage.

Further, the cluster in which the data is stored as the owner-controlled data with respect to the each port of the EFA, as well as the cluster in which the data is stored as the owner-controlled data according to the owner of the MP may be selected from the two clusters. Note that all the data of the cache memories 110 and 120 is received by one of the ports of the FEA 211 and 221 and are temporarily stored in the cache memories 110 and 120, so that data stored in the cache memory 110 or 120 is written into the LDEV AA 170 or the LDEV BB 180 by the MP 305 or 306. Thus, all the data of the cache memories 110 and 120 is to be converted to the owner-controlled dirty data of the cluster 1 101 or the owner-controlled dirty data of the cluster 2 102 at the time of writing the cache memory 110 or 120. Then, although dirty data is converted to clean data when the data is written into LDEV, all the dirty data is owner-controlled dirty data of the cluster 1 101 or the cluster 2 102.

Figure 4:
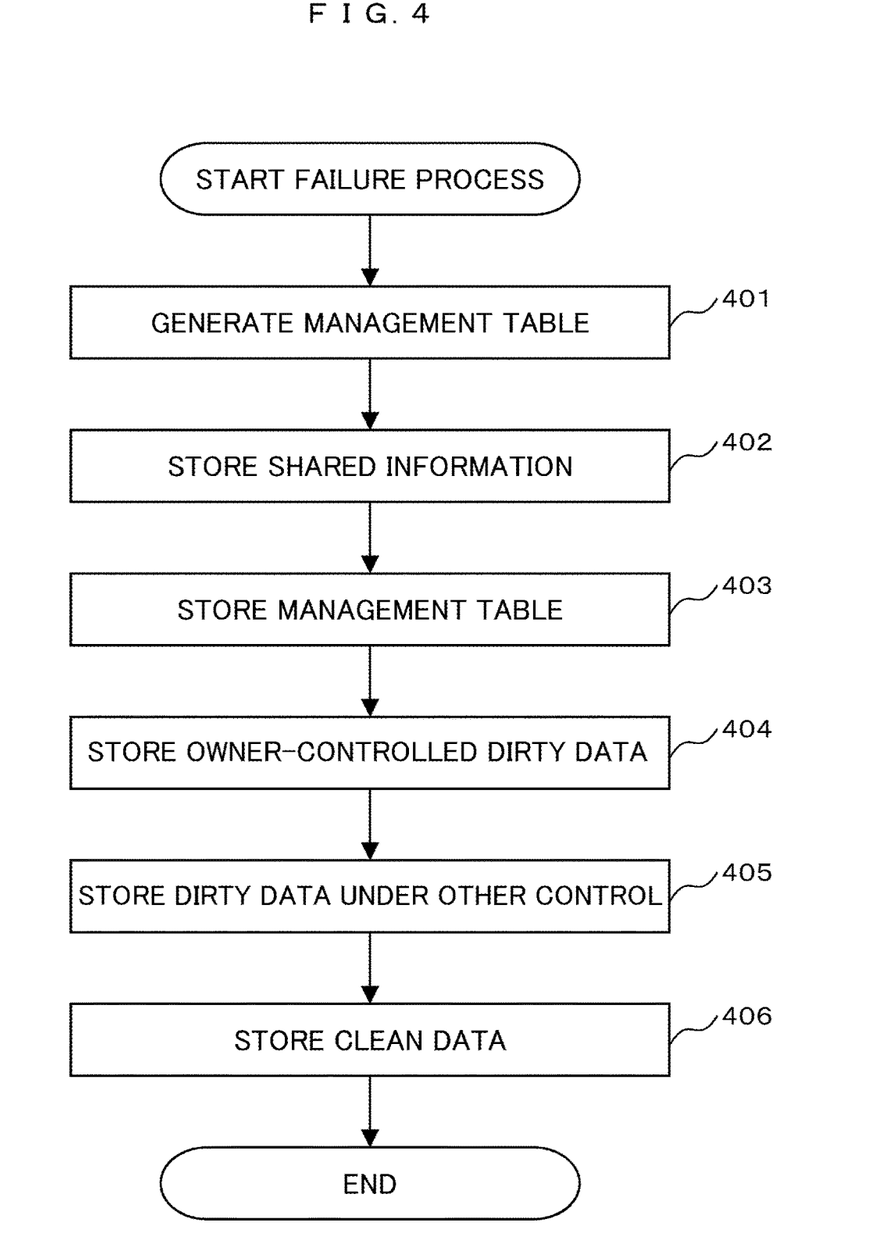
FIG. 4 is a view of an example of a failure process flow chart.

FIG. 4 is a view of an example of a failure process flow chart. This example is a flow chart of the program of MP, which is executed by the plural MPs 212 and 222 by using power of the battery upon detection of a failure such as a power outage. The failure may be detected by the MP 212 or 222, or may be detected in other circuit and notified to the MP 212 or 222 from the detected circuit. Here, there is no need for the plural MPs 212 and 222 to perform the same steps at the same time. Thus, in the following description, the MPs 212 and 222 will be referred to as MP representing any one of the MPs 212 and 222. FIG. 6 is a view of an example of the data for the failure process and the recovery process. It is shown the data of the cluster 1 101 as a typical example, but the data of the other cluster has the same structure. Each of the steps shown in FIG. 4 will be described in association with the data shown in FIG. 5.

In Step 401, the MP generates a management table. The management table is the information for managing the data to be stored in the save memory 130. In this example, it is assumed that the owner-controlled dirty data AAB 113 is stored in the cache memory 110 at the address 0x06AAA (0x represents a hexadecimal number) and will be stored in the save memory 130 at the address 0x03AAA as AAB 133. Further, it is assumed that the dirty data BBA 112 under other control is stored in the cache memory 110 at the address 0x05BBA and will be stored in the save memory 130 at the address 0x02BBA as BBA 132. Then, it is assumed that the clean data AAA 111 is stored in the cache memory 110 at the address 0x04AAB and will be stored in the save memory 130 at the address 0x01AAB as AAA 131.

As described above, the MP generates a management table in which an address 632 within the save memory is associated with an address 633 within the cache memory with respect to each data piece, added with information on owner-controlled data or data under other control or clean data as a flag 634. Note that when the save memory 130 is SSD and the like, the address 632 of the save memory may be the logical block address (LBA) of the SSD. Further, the information of the data size of AAA 111 and so on may also bP included in the management table, or the information may not be included in the management table under the assumption that the data size is constant.

In Step 402, the MP stores shared information 611 within the cache memory 110 into the save memory 130 as shared information 631. The shared information 611 is the configuration information of the storage 100 and the like, which includes, for example, the relationship between port and LDEV, the information on which MP is the owner of the LDEV, and the like. In addition, when the content of the failure detected in the failure detection can be recorded in the shared information 611, the failure information may be included in the shared information 611. In Step 403, the MP stores the management table into the save memory 130. In Step 404, the MP stores the owner-controlled dirty data into the save memory 130 based on the management table generated in Step 401. Further, in Step 405, the MP stores the dirty data under other control into the save memory 130 based on the management table. In Step 406, the MP stores the clean data into the save memory 130 based on the management table, and then ends the process.

Figure 5:
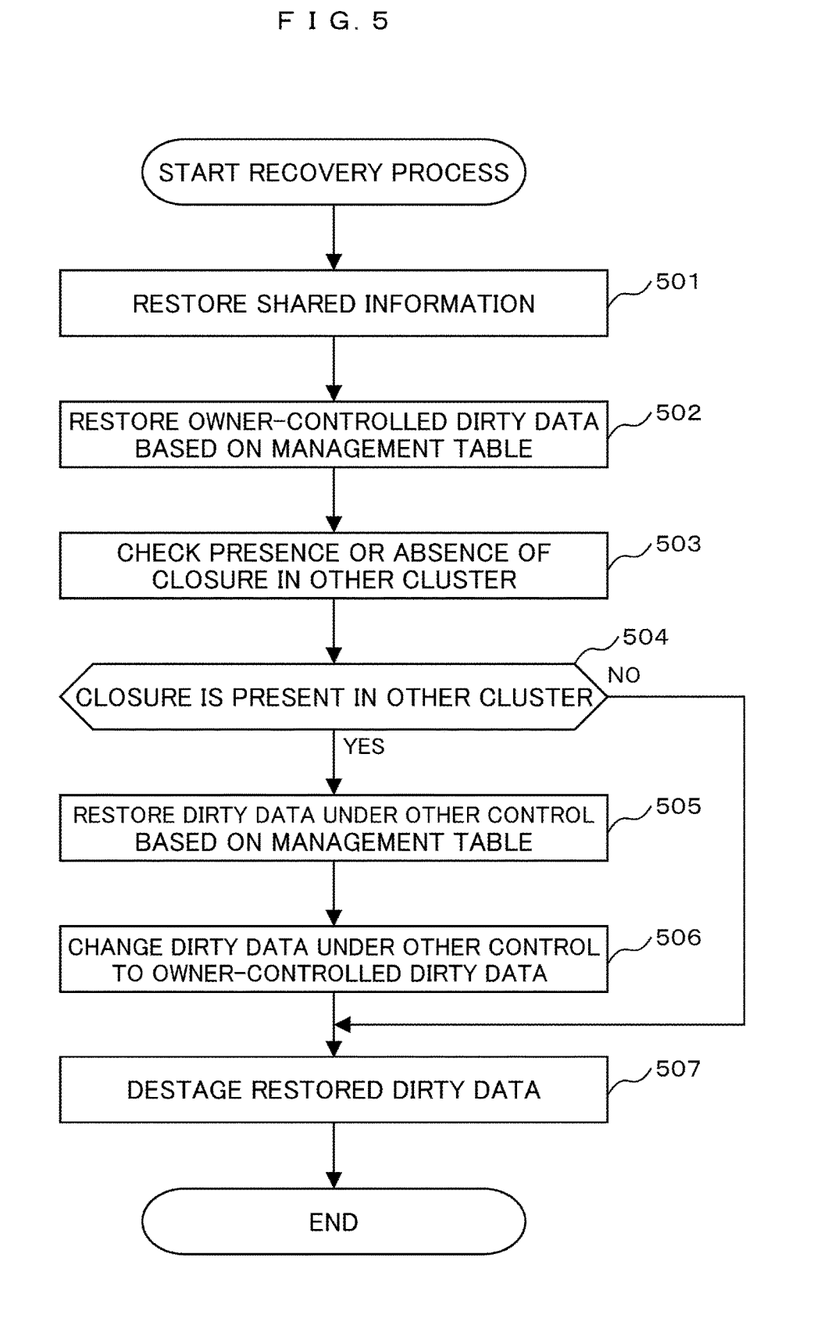
FIG. 5 is a view of an example of a recovery process flow chart.
Figure 6:
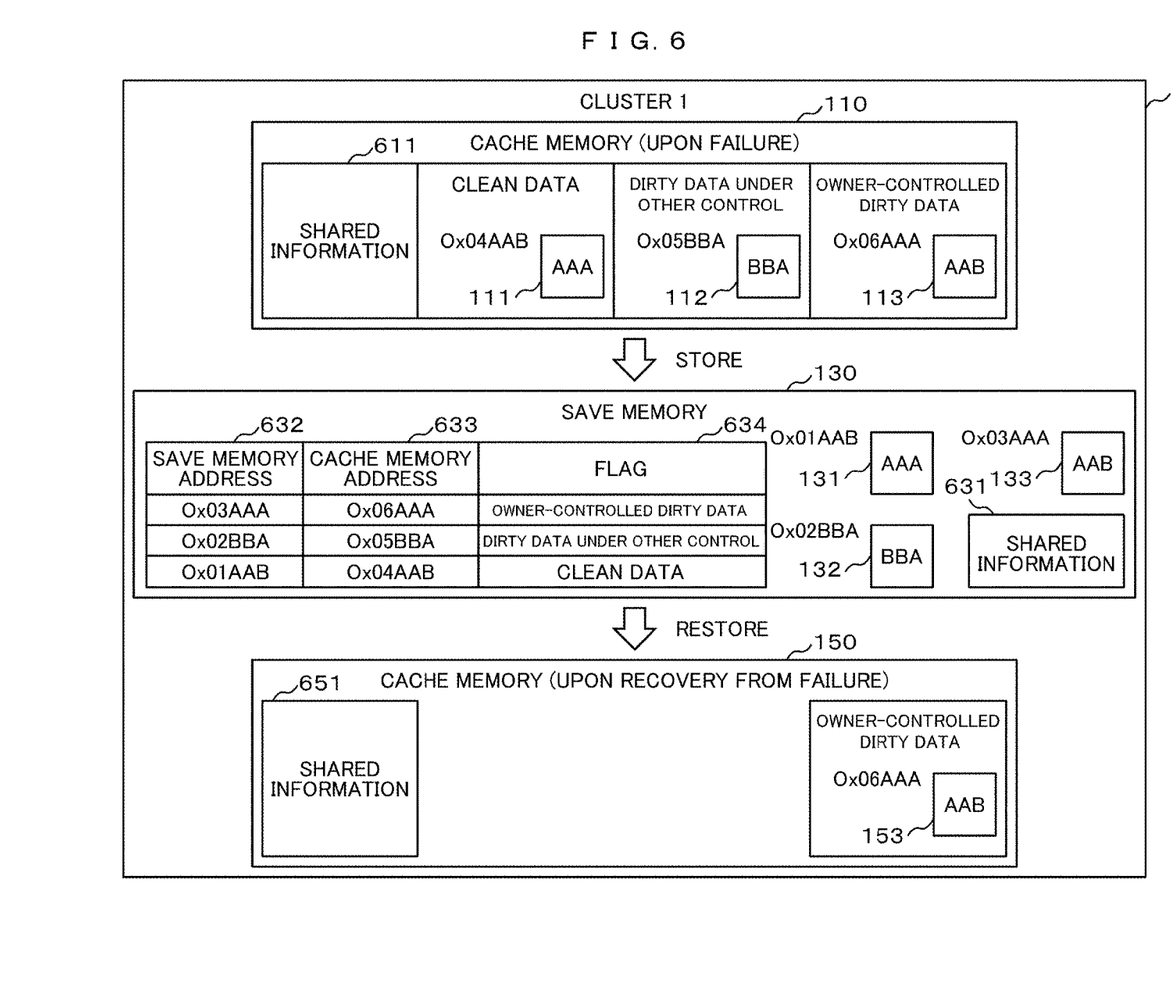
FIG. 6 is a view of an example of data in which no closed cluster is present.

FIG. 5 is a view of an example of a recovery process flow chart. Also this example is a flow chart of the program of the MP, which is executed by each of the plural MPs 212 and 222 upon restart from a failure such as a power outage. Here, it is assumed that at least the power outage recovered and that the power supply from the commercial power source is resumed. In Step 501, the MP restores the shared information 631 of the save memory 130 into the cache memory 150 as shared information 651.

In Step 502, the MP restores the owner-controlled dirty data based on the management table. In other words, the MP reads AAB 113 from the address 0x03AAA of the address 632 of the save memory in which the owner-controlled dirty data is entered in the flag 634. Then, the MP writes the read data into the address 0x06AAA of the address 633 of the cache memory as AAB 153. In Step 503, the MP checks if there is closure in the other cluster (the other cluster is blocked), for example, in the cluster 2 102. The MP may communicate with the other MP to check the presence or absence of closure, or may refer to the failure information when the failure information is included in the shared information 631.

In Step 504, if it is determined that there is no closure in the other cluster, namely, if it is determined that all the clusters are normal, the MP proceeds to Step 507. Then, the MP destages the restored owner-controlled dirty data AAB 153 to the LDEV AA 170. Because of this process, AAB 309 can actually be present, and thus AAB 113 and AAB 153 are converted to clean data. As a result, the fault tolerance can be ensured. Then, the operation can be resumed at this time. As for the resumption of the operation, the operation process may be resumed in the host, not shown, which is provided separately from the storage 100, or the storage 100 may reject communication with the host through FEA until Step 507 and enable communication with the host through the FEA in Step 507.

Note that each MP performs the same procedure also in the other cluster. For example, in the cluster 2 102, the owner-controlled dirty data BBA 122 is restored to the cache memory and is destaged to the LDEV BB 180. Thus, it is also possible to resume the operation at the time of completion of Step 507 in all the clusters.

Figure 7:
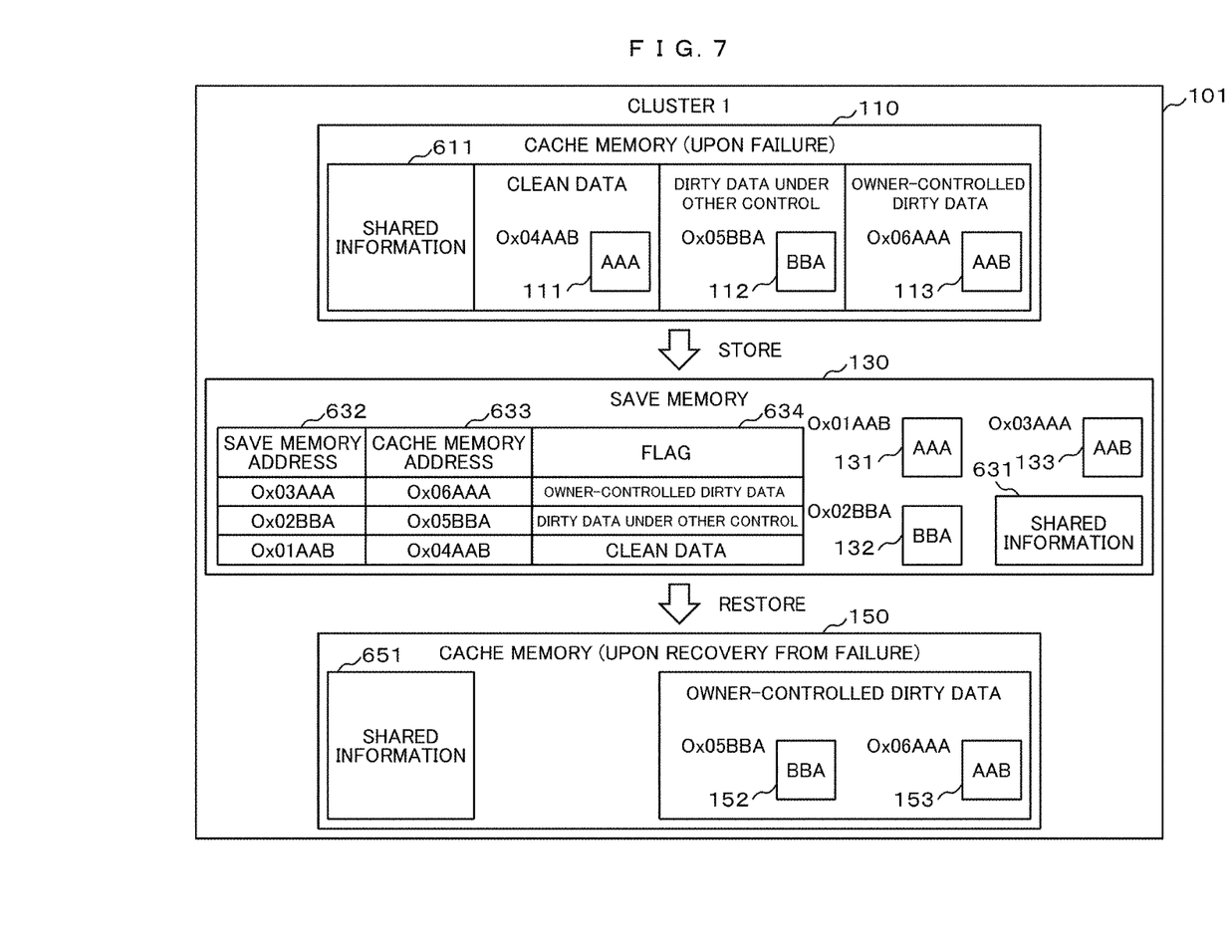
FIG. 7 is a view of an example of data in which a closed cluster is present.

In Step 504, if it is determined that there is closure in the other cluster, the MP proceeds to Step 505. Then, the MP restores the dirty data under other control based on the management table. In other words, as shown in FIG. 7, the MP reads BBA 132 from the address 0x02BBA of the address 633 of the save memory in which the dirty data under other control is entered in the flag 634. Then, the MP writes the read data into the address 0x05BBA of the address 633 of the cache memory as BBA 152. Then, in Step 506, the MP changes the dirty data BBA 152 under other control to the owner-controlled dirty data. At this time, the MP may be the owner of both LDEV AA 170 and LDEV BB 180 by changing the content of the shared information 651.

In Step 507, the MP destages the restored owner-controlled dirty data to LDEV AA 170 and LDEV BB 180. As shown in FIG. 2, the PDEVs 231 and 232 are connected to the cluster 1 101 and the cluster 2 102 in such a way that they can physically be accessed from both of the clusters. Thus, the MPs 212 and 305 can physically be accessed to the LDEV BB 180. In this way, both AAB 309 and BBA 310 can actually be present. Then, AABs 113 and 153 as well as BBAs 112 and 152 are changed to clean data. Then, the operation can be resumed at this time.

Note that when the storage 100 has three or more clusters of which two or more clusters are not closed, one of the clusters not closed restores the owner-controlled dirty data of the closed cluster. There is no need to restore the owner-controlled dirty data of the other cluster that is not closed. Further, the data to be restored may be distributed in plural clusters not closed. In order to achieve this, the management table may include the information of the cluster to which the owner-controlled dirty data belongs.

Figure 8:
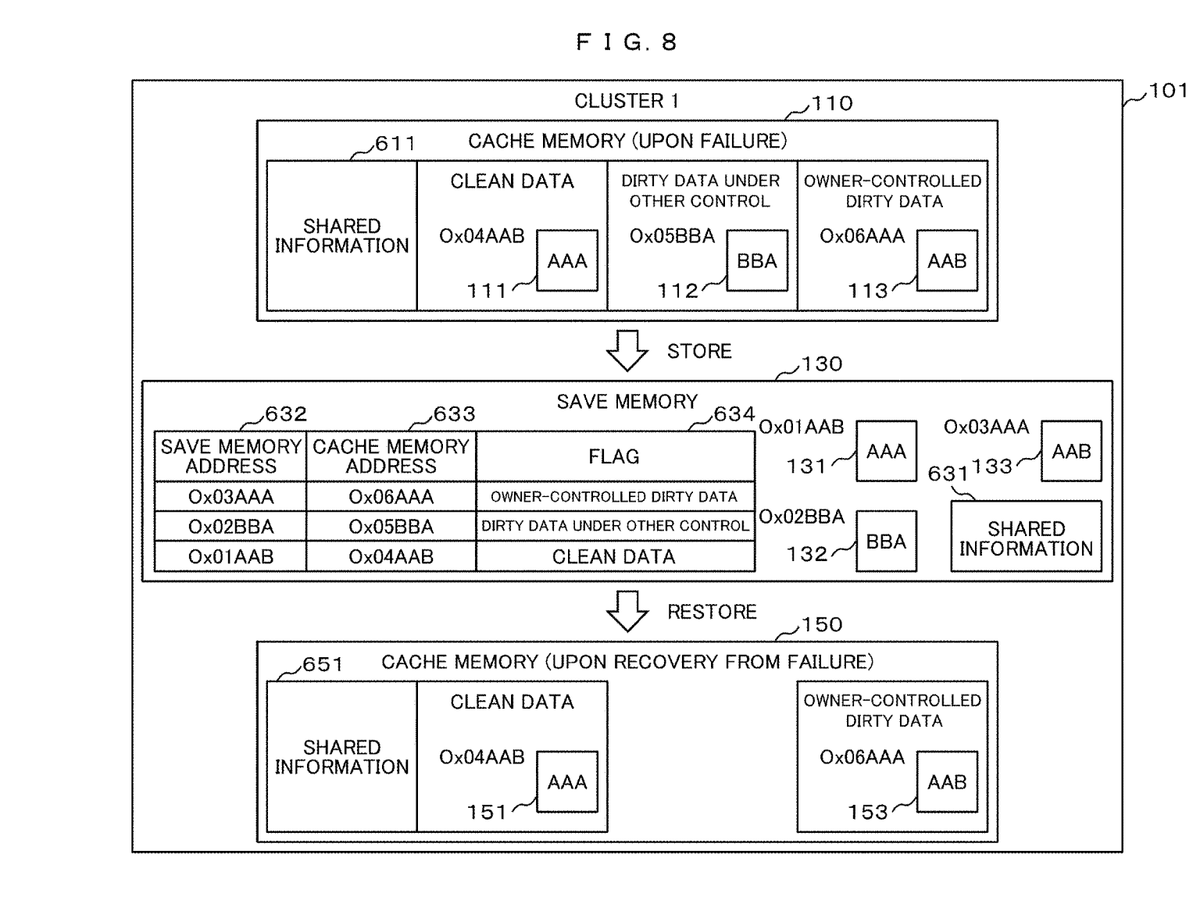
FIG. 8 is a view of an example of data in which no closed cluster is present and clean data is restored.

In Step 502, the MP may restore the clean data. FIG. 8 is a view of an example of the data when the MP restores the clean data in Step 502 and when the MP determines that there is no closure in the other cluster in Step 504. In Step 502, the MP reads AAA 131 from the address 0x01AAB of the address 632 of the save memory in which clean data is entered in the flag 634, and writes into the address 0x04AAB of the address 633 of the cache memory as AAA 151. The clean data AAA 151 has been stored in the LDEV AA 170, so that there is no need to destage the data in Step 507.

Figure 9:
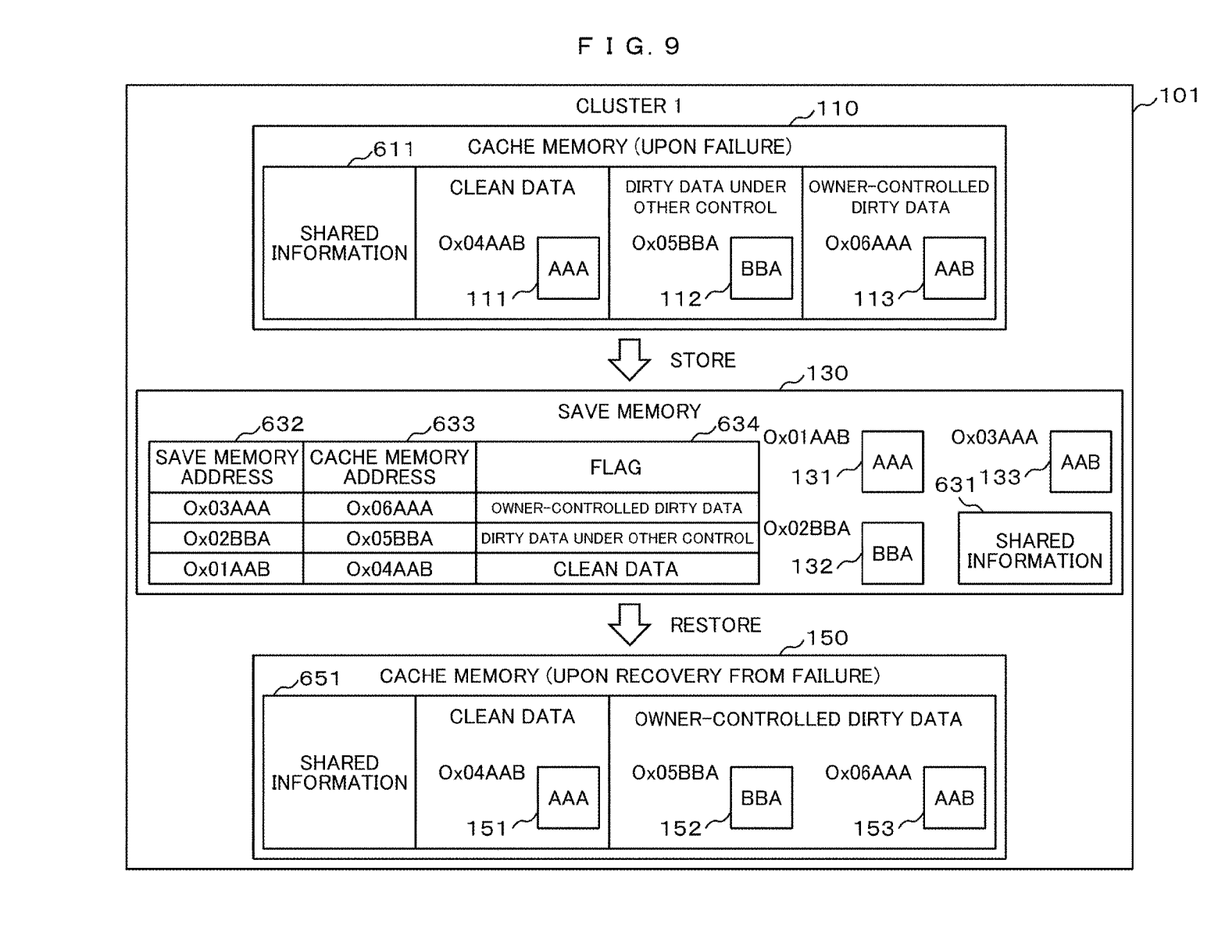
FIG. 9 is a view of an example of data in which a closed cluster is present and clean data is restored.

FIG. 9 is a view showing an example when the MP restores the clean data in Step 502 and the MP determines that there is closure in the other cluster in Step 504. The restored data within the cache memory 150 is the same as the data within the cache memory 110 upon an occurrence of the failure. In this way, by also listing the clean data in the cache memory, it is possible to reduce the time for reading data, for example, AAA 151 from the host.

As described above, by limiting the data to be restored from the cache memory upon recovery from a failure in each of the plural clusters, it is possible to reduce the time for restoring data from the cache memory and to implement early resumption of the operation. Further, when there is a fault in the cluster, other cluster is also operable to restore the data of the faulty cluster in order to ensure the fault tolerance.

LIST OF REFERENCE SIGNS

100: storage
101: cluster 1
102: cluster 2
110, 120, 150, 160, 214, 224: cache memory
130, 140, 215, 225: save memory

The invention claimed is:
1. A storage including a plurality of clusters and a storage device, each of the clusters comprising a processor, a cache memory, and a save memory, the processor of each of the clusters configured to:

write data into the cache memory of the cluster including:
  clean data stored in a storage device associated with the cluster,
  controlled dirty data for selective storage in the associated storage device by the cluster, and
  uncontrolled dirty data for selective storage in a storage device by another cluster;
store all the data stored in the cache memory into the save memory of the cluster upon the occurrence of a failure;
check closure in the other cluster upon recovery from the failure,
if the other cluster is not closed, restore the controlled dirty data, but not the uncontrolled dirty data stored in the save memory into the cache memory; and
if the other cluster is closed, restore both the controlled dirty data and the uncontrolled dirty data into the cache memory as controlled dirty data.

2. A storage according to claim 1,
wherein the processor controls to destage the restored data, from the cache memory to the storage device.

3. A storage according to claim 2,
wherein the processor generates correspondence information between the address of the data within the cache memory, the address of the data within the save memory, and the relevant information to the cluster and the storage device with respect to the data, and stores the correspondence information into the save memory.

4. A storage according to claim 3,
wherein if the other cluster is not closed, the processor restores only the data corresponding to the relevant information of specific content of the relevant information, into the cache memory.

5. A storage according to claim 4,
wherein the processor generates the correspondence information by determining the relevant information according to which cluster processor is set to destage the data.

6. A control method of a storage including a storage device and a plurality of clusters, each of the clusters comprising a processor, a cache memory, and a save memory, includes:
  a first step in which the processor of a cluster controls writing of data into the cache of the cluster including:
    clean data stored in a storage device associated with the cluster,
    controlled dirty data for selective storage in the associated storage device by the cluster, and
    uncontrolled dirty data for selective storage in a storage device by another cluster;
  a second step in which the processor controls saving all the data stored in the cache memory into the save memory upon an occurrence of a failure; and
  a third step in which the processor checks closure in the other cluster,
  wherein, in the third step, if the other cluster is not closed, the processor controls restoring of the controlled dirty data, but not the uncontrolled dirty data stored in the save memory into the cache memory, and
  wherein, in the third step, if the other cluster is closed, the processor controls restoring of both the controlled dirty data and the uncontrolled dirty data into the cache memory as controlled dirty data.

* * * * *